(12) United States Patent
Rowley

(10) Patent No.: US 8,612,974 B2
(45) Date of Patent: Dec. 17, 2013

(54) DYNAMIC SERVICE TOPOLOGY

(75) Inventor: Peter Andrew Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 1237 days.

(21) Appl. No.: 11/879,377

(22) Filed: Jul. 16, 2007

(65) Prior Publication Data

US 2009/0024995 A1    Jan. 22, 2009

(51) Int. Cl.
*G06F 9/455* (2006.01)
*G06F 15/16* (2006.01)

(52) U.S. Cl.
USPC ............................................. 718/1; 709/201

(58) Field of Classification Search
USPC .............................................. 718/1; 709/201
See application file for complete search history.

(56) References Cited

U.S. PATENT DOCUMENTS

| | | | |
|---|---|---|---|
| 6,401,121 B1 * | 6/2002 | Yoshida et al. | 709/227 |
| 7,203,944 B1 * | 4/2007 | van Rietschote et al. | 718/104 |
| 7,607,129 B2 * | 10/2009 | Rosu et al. | 718/1 |
| 2006/0069761 A1 * | 3/2006 | Singh et al. | 709/222 |
| 2007/0169121 A1 * | 7/2007 | Hunt et al. | 718/1 |
| 2008/0046890 A1 * | 2/2008 | Dunlap et al. | 718/104 |

* cited by examiner

*Primary Examiner* — Meng An
*Assistant Examiner* — Blake Kumabe
(74) *Attorney, Agent, or Firm* — Lowenstein Sandler LLP

(57) ABSTRACT

A method and apparatus for a dynamic service topology. One service is assigned to a virtual machine. The virtual machine is assigned to a physical machine on a network. The service of the virtual machine is transferable from the physical machine to another physical machine on the network by moving the virtual machine.

15 Claims, 5 Drawing Sheets

DYNAMIC SERVICE TOPOLOGY

TECHNICAL FIELD

Embodiments of the present invention relate to virtual machines, and more particularly to dynamic service topology.

BACKGROUND

In tradition IT infrastruture, several services such as LDAP, email, etc. are assigned to a physical machine on a network. Usually any kind of maintenance or upgrate requires service disruption. Moving a service to a new physical machine is a major undertaking. Further, creating a new infrastructure requires a lot of planning and post install tuning. As such, a need exists for an easy and efficient way to transfer services between physical machines.

BRIEF DESCRIPTION OF THE DRAWINGS

The present invention is illustrated by way of example, and not by way of limitation, in the figures of the accompanying drawings and in which.

DETAILED DESCRIPTION

Figure 1:
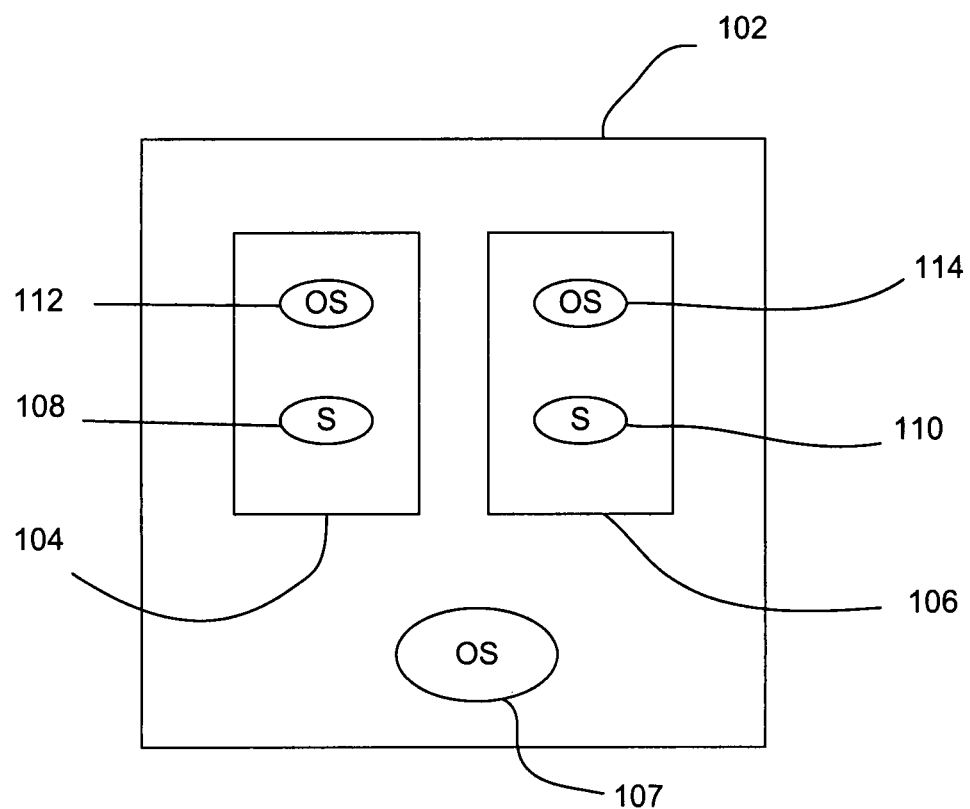
FIG. 1 is a block diagram illustrating a virtual machine system in accordance with one embodiment.

Described herein is a method and apparatus for a dynamic service topology. One service is assigned to a virtual machine. The virtual machine is assigned to a physical machine on a network. The service of the virtual machine can be transferred from the physical machine to another physical machine on the network.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram illustrating a virtual machine system in accordance with one embodiment. A physical machine 102 or hardware system may comprise one or more virtual machines 104, 106. As such, one more virtual machines 104, 106 are assigned and are running on the physical machine 102. The physical machine 102 may also include a host operating system 108 or a hypervisor that controls operation of the virtual machines 104, 106 running on the physical machine 102.

Each virtual machine 104, 106 is assigned to its own respective service 108, 110. In accordance with one embodiment, each virtual machine is assigned to only one service. Each virtual machine 104, 106 also comprise its own respective operating system 112, 114.

In accordance with one embodiment, a service provides operations and functions performed with a particular server. For example, a service may include a mail server, an LDAP server, an address server, or a credential checking server.

Those of ordinary skills in the art will recognize that the above services are for illustration purposes and that other services may exist.

Figure 2:
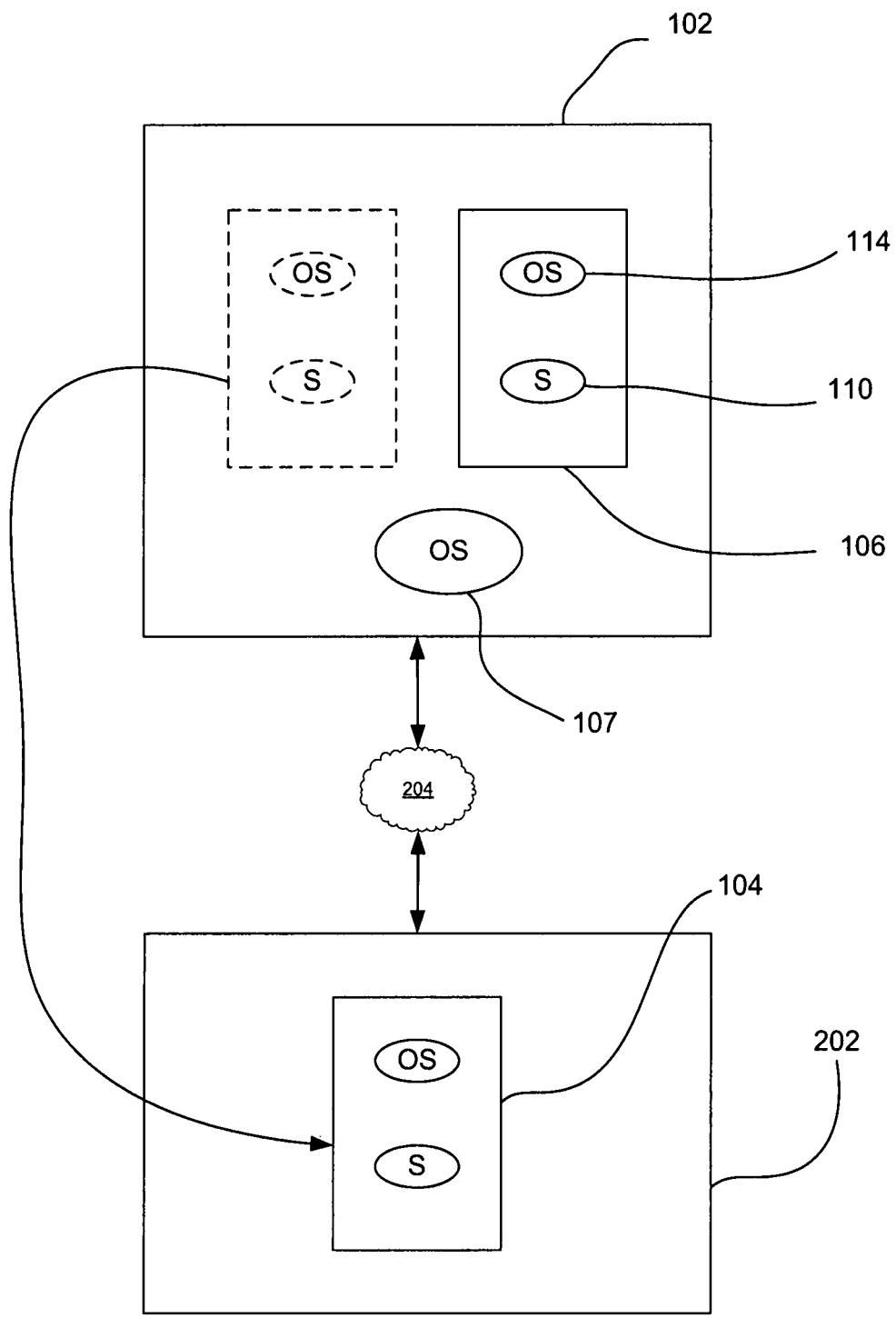
FIG. 2 is a block diagram illustrating a transfer of a service in accordance with one embodiment.

FIG. 2 is a block diagram illustrating a transfer of a service in accordance with one embodiment. The physical machine 102 of FIG. 1 may be coupled to another physical machine 202 via a network 204. FIG. 2 illustrates an example where the service 108 is moved from one physical machine 102 to another physical machine 202. Such a transfer may be accomplished easily by transferring or moving the corresponding virtual machine 104 of the service 108 to the other physical machine 202. Those of ordinary skills in the art will recognize that the transfer or move of a virtual machine from one physical machine to another physical machine may be accomplished in many ways. For example, the OS and the service applications may be re-installed on the new physical machine while copying the data used by the OS and the service applications from the former virtual machine to the new virtual machine.

Figure 3:
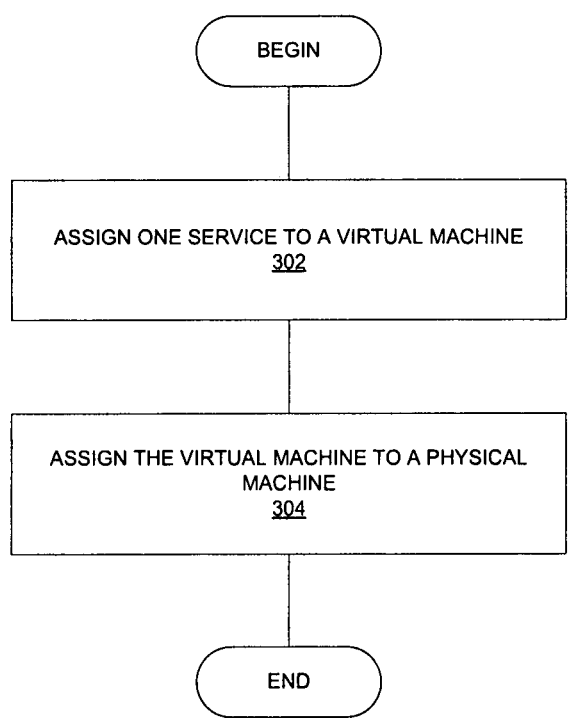
FIG. 3 is a flow diagram illustrating a method for configuring a virtual machine in accordance with one embodiment.

FIG. 3 is a flow diagram illustrating a method for configuring a virtual machine in accordance with one embodiment. At 302, a service is assigned to a virtual machine. Each virtual machine is associated with only one service. At 304, the virtual machine is assigned to a physical machine on a network. Decoupling the service from the physical machine allows the service to be migrated to other machines with minimal service disruption, for example, in the case of hardware upgrade or load balancing the services on the network. In one embodiment, the decoupling may be accomplished by deleting the OS and the service application from one physical machine and re-installing the OS and the service application onto another physical machine. In another embodiment, the decoupling may be accomplished by re-assigning or re-associating the actual physical machine on which the virtual machine operates. Those of ordinary skills in the art will recognize that there are other ways of decoupling and recoupling the virtual machine from one physical machine to another physical machine.

Figure 4:
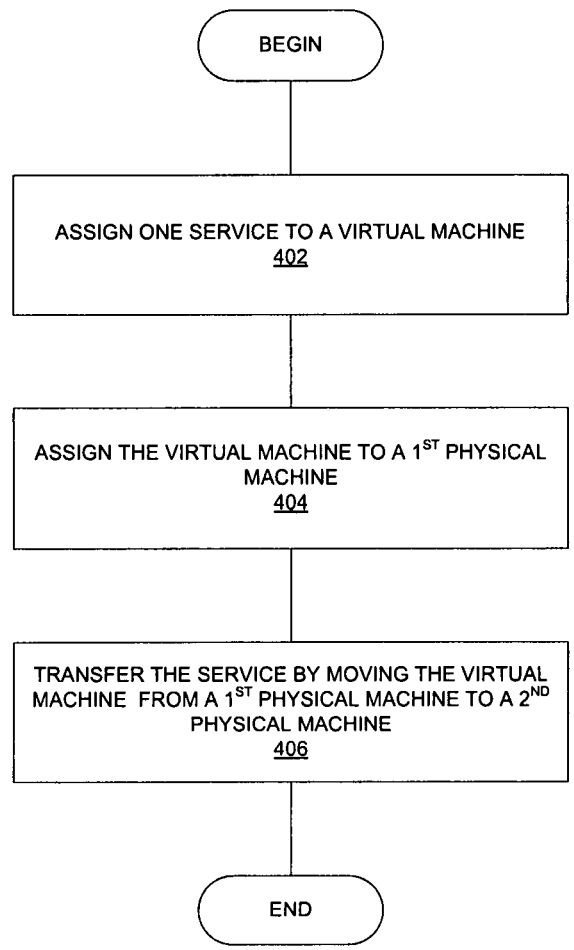
FIG. 4 is a flow diagram illustrating a method for moving a service of a virtual machine in accordance with one embodiment.

FIG. 4 is a flow diagram illustrating a method for moving a service of a virtual machine in accordance with one embodiment. The method is performed at the physical machine on which the virtual machine resides. At 402, a service is assigned to a virtual machine. Each virtual machine is associated with only one service. At 404, the virtual machine is assigned to a first physical machine on a network. At 406, a transfer of the service may be performed by moving the virtual machine from the first physical machine to a second physical machine on the network.

Since a virtual machine service may also serve as a "template" for how an application needs to be structured, additional infrastructure can be quickly deployed. For example, if a new office opens that requires a set of services, the appropriate templates can be used to deploy the new office infrastructure with minimal configuration required. In one embodiment, since only one service is associated with one virtual machine, the addition of services may be easily accomplished by adding an additional virtual machine associated with the service to a physical machine. Those of ordinary skills in the art will recognize that there exists many ways to add a virtual machine to a physical machine.

Figure 5:
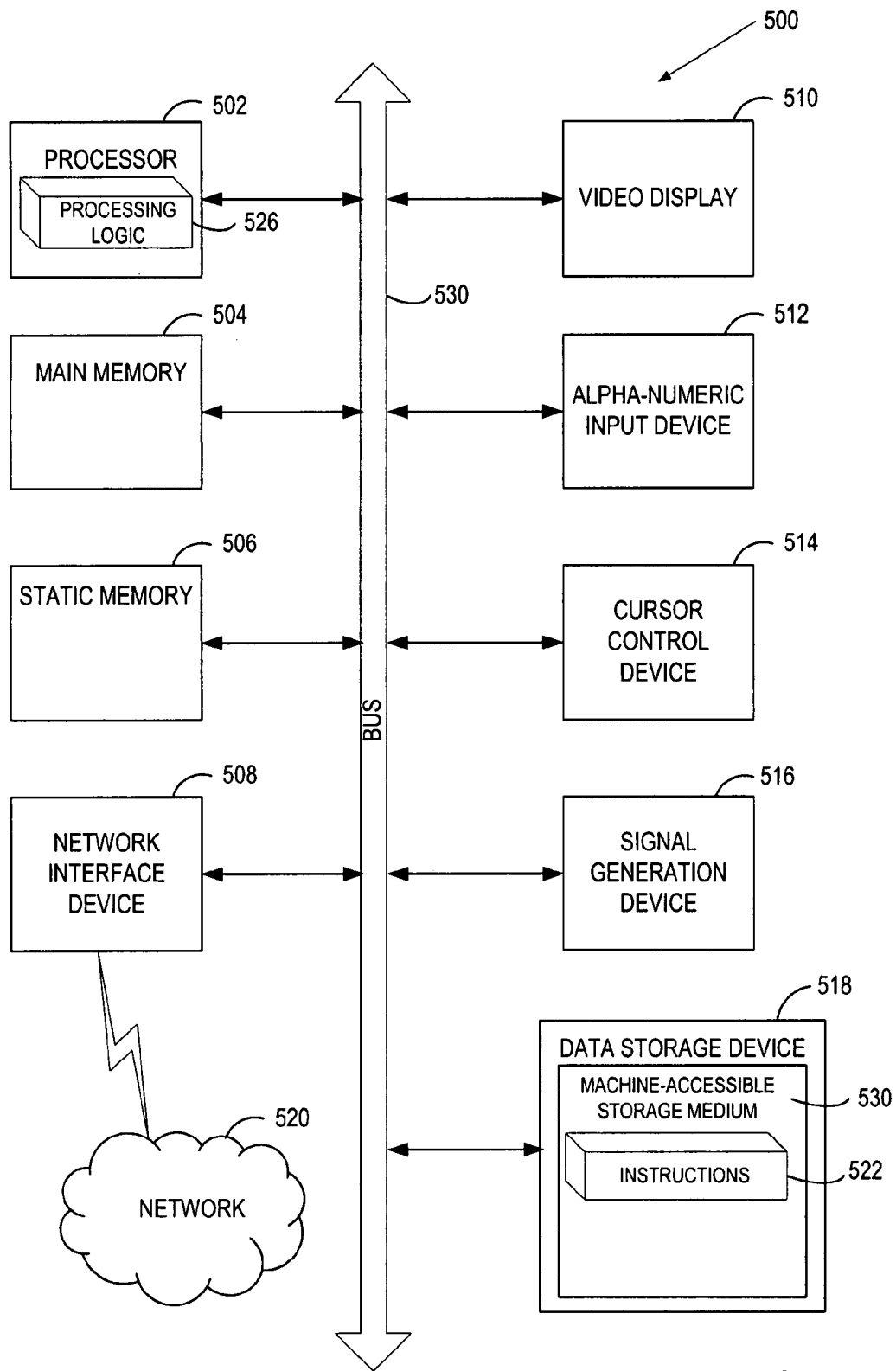
FIG. 5 is a block diagram illustrating an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for moving services has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    providing a service on a server machine specialized to perform the service, wherein the service comprises operations and functions associated with at least one of a mail server, an LDAP server, an address server, or a credential checking server;
    assigning the operations and functions of the service to a virtual machine (VM), wherein the VM is dedicated to performing the operations and functions of the service and comprises the service solely associated with the VM and an operating system to operate with the service of the VM;
    assigning the VM to a first computing machine for hosting by the first computing machine;
    providing the service on the VM hosted by the first computing machine;
    determining that the service is to be transferred to another physical machine;
    assigning the VM to a second computing machine comprising the another physical machine, the VM to be hosted by the second computing machine, wherein assigning the VM to the second computing machine transfers the service to the second computing machine by:
        copying the operating system and service applications associated with the service to the second computing machine;
        decoupling the service from the first computing machine, wherein decoupling the service comprises deleting the operating system and service applications associated with the service from the first computing machine; and
        re-installing the operating system and service applications associated with the service onto the VM on the second computing machine;
    providing the service on the VM hosted by the second computing machine;
    utilizing the VM as a template for creation of one or more additional VMs dedicated to performing the operation and functions of the service and only assigned to the service; and
    deploying the additional VMs on a third computing machine.

2. The method of claim 1 further comprising reassigning the virtual machine to a fourth computing machine on the network in order to decouple the service from the second computing machine to the fourth computing machine.

3. The method of claim 1 wherein transferring the service further comprising deleting the operating system and service applications on the server machine subsequent to the decoupling.

4. The method of claim 1 wherein the second computing machine comprises:
    one or more VMs, each VM associated with other services in a one-to-one arrangement; and
    an operating system to control the one or more VMs.

5. The method of claim 1, wherein the service is transferred from the server machine to the VM by copying the service to the VM prior to deleting the service on the server machine.

6. An apparatus comprising:
    a memory;
    a processing device communicably coupled to the memory;
    an operating system executable from the memory by the processing device, the operating system to:
        operate one or more virtual machines (VMs)
        provide a service on a server machine specialized to perform the service, wherein the service comprises operations and functions associated with at least one of a mail server, an LDAP server, an address server, or a credential checking server;
        assign the operations and functions of the service to a VM of the one or more VMs, wherein the VM is dedicated to performing the operations and functions of the service and comprises the service solely associated with the VM and an operating system to operate with the service of the VM;
        assign the VM to a first computing machine for hosting by the first computing machine;
        provide the service on the VM hosted by the first computing machine;
        determine that the service is to be transferred to another physical machine;
        assign the VM to a second computing machine comprising the another physical machine, the VM to be hosted by the second computing machine, wherein assigning the VM to the second computing machine transfers the service to the second computing machine by:
            copying the operating system and service applications associated with the service to the second computing machine;
            decoupling the service from the first computing machine, wherein decoupling the service comprises deleting the operating system and service applications associated with the service from the first computing machine; and
            re-installing the operating system and service applications associated with the service onto the VM on the second computing machine;
        provide the service on the VM hosted by the second computing machine;
        utilize the VM as a template for creation of one or more additional VMs dedicated to performing the operation and functions of the service and only assigned to the service; and
        deploy the additional VMs on a third computing machine.

7. The apparatus of claim 6 wherein the service is transferred from the server machine to the VM by copying the service to the VM prior to deleting the service on the server machine.

8. The apparatus of claim 6 wherein the operating system further to reassign the VM to a fourth computing machine on the network in order to decouple the service from the second computing machine to the fourth computing machine.

9. The apparatus of claim 6 wherein the operating system is further to delete the operating system and service applications on the server machine subsequent to the decoupling.

10. The apparatus of claim 6, wherein the second physical machine comprises:
    one or more VMs, each VM associated with other services in a one-to-one arrangement; and
    another operating system to control the one or more VMs.

11. A non-transitory machine-accessible storage medium including data that, when accessed by a processing device, cause the processing device-to perform operations comprising:
- providing a service on a server machine specialized to perform the service, wherein the service comprises operations and functions associated with at least one of a mail server, an LDAP server, an address server, or a credential checking server;
- assigning the operations and functions of the service to a virtual machine (VM), wherein the VM is dedicated to performing the operations and functions of the service and comprises the service solely associated with the VM and an operating system to operate with the service of the VM;
- assigning the VM to a first computing machine for hosting by the first computing machine;
- providing the service on the VM hosted by the first computing machine;
- determining that the service is to be transferred to another physical machine;
- assigning the VM to a second computing machine comprising the another physical machine, the VM to be hosted by the second computing machine, wherein assigning the VM to the second computing machine transfers the service to the second computing machine by:
  - copying the operating system and service applications associated with the service to the second computing machine;
  - decoupling the service from the first computing machine, wherein decoupling the service comprises deleting the operating system and service applications associated with the service from the first computing machine; and
  - re-installing the operating system and service applications associated with the service onto the VM on the second computing machine;
- providing the service on the VM hosted by the second computing machine;
- utilizing the VM as a template for creation of one or more additional VMs dedicated to performing the operation and functions of the service and only assigned to the service; and
- deploying the additional VMs on a third computing machine.

12. The non-transitory machine-accessible storage medium of claim 11 wherein the operations further comprise:
- reassigning the VM to a fourth computing machine on the network in order to decouple the service from the second computing machine to the fourth computing machine.

13. The non-transitory machine-accessible storage medium of claim 11 wherein the operations further comprise deleting the operating system and service applications on the server machine subsequent to the decoupling.

14. The non-transitory machine-accessible storage medium of claim 11 wherein the second physical machine comprises:
- one or more VMs, each VM associated with other services in a one-to-one arrangement; and
- another operating system to control the one or more VMs.

15. The non-transitory machine-accessible storage medium of claim 11, wherein the service is transferred from the server machine to the VM by copying the service to the VM prior to deleting the service on the server machine.

* * * * *